(12) United States Patent
Ramasubramanian et al.

(10) Patent No.: US 12,430,870 B2
(45) Date of Patent: Sep. 30, 2025

(54) METHOD AND SYSTEM FOR EXTRACTING INFORMATION BASED ON USER INTERACTIONS PERFORMED ON A SCREEN OF A COMPUTING SYSTEM

(71) Applicant: EdgeVerve Systems Limited, Bangalore (IN)

(72) Inventors: Guha Ramasubramanian, Bangalore (IN); Archana Yadav, Pune (IN); Prasad Ghatpande, Pune (IN); Daniel Nia, Dallas, TX (US); M. Mahdi Davari Esfahani, Harrison, NJ (US)

(73) Assignee: EDGEVERVE SYSTEMS LIMITED, Bangalore (IN)

( * ) Notice: Subject to any disclaimer, the term of this patent is extended or adjusted under 35 U.S.C. 154(b) by 357 days.

(21) Appl. No.: 17/939,187

(22) Filed: Sep. 7, 2022

(65) Prior Publication Data

US 2023/0368491 A1    Nov. 16, 2023

(30) Foreign Application Priority Data

May 12, 2022   (IN) .............................. 202241027312

(51) Int. Cl.
*G06V 10/44*    (2022.01)
*G06V 10/22*    (2022.01)
(Continued)

(52) U.S. Cl.
CPC ............ *G06V 10/443* (2022.01); *G06V 10/23* (2022.01); *G06V 10/25* (2022.01); *G06V 10/751* (2022.01);
(Continued)

(58) Field of Classification Search
CPC ...... G06V 10/443; G06V 10/23; G06V 10/25; G06V 10/751; G06V 10/759; G06V 20/41;
(Continued)

(56) References Cited

U.S. PATENT DOCUMENTS 9,883,035 B1 *    1/2018   Kulkarni ................. G06F 18/22
11,068,738 B1 *   7/2021   Skarda ............. G06V 30/19013
(Continued)

*Primary Examiner* — John Villecco
*Assistant Examiner* — Kyla Guan-Ping Tiao Allen
(74) *Attorney, Agent, or Firm* — Troutman Pepper Locke LLP

(57) ABSTRACT

The present disclosure relates to method and system for extracting information based on user interactions performed on screen of a computing system. Method includes receiving processed input data comprising video capturing screen and user interactions events occurring from user interactions, and co-ordinate information. Thereafter, computing system determines Regions of Interest (RoI) on screen based on captured user interactions, events and co-ordinate information, and identifies type of user interaction performed with at least one screen element in the RoI, as either keyboard or mouse type interaction. Subsequently, computing system performs one of: determining type of screen element as a text box or a table based on pattern recognition when type of user interaction is identified as keyboard type interaction or determining type of screen element to be selectable User Interface elements and extracting content and label of selectable UI elements, when interaction is identified as mouse type interaction.

21 Claims, 13 Drawing Sheets

(51) Int. Cl.
   *G06V 10/25*   (2022.01)
   *G06V 10/75*   (2022.01)
   *G06V 20/40*   (2022.01)
   *G06V 20/62*   (2022.01)

(52) U.S. Cl.
   CPC ............ *G06V 10/759* (2022.01); *G06V 20/41* (2022.01); *G06V 20/44* (2022.01); *G06V 20/48* (2022.01); *G06V 20/62* (2022.01); *G06V 2201/02* (2022.01)

(58) Field of Classification Search
   CPC ........ G06V 20/44; G06V 20/48; G06V 20/62; G06V 2201/02
   See application file for complete search history.

(56) References Cited

U.S. PATENT DOCUMENTS

| | | | |
|---|---|---|---|
| 2012/0324341 A1* | 12/2012 | Dejean | G06F 40/103 715/243 |
| 2015/0039637 A1* | 2/2015 | Neuhauser | G06V 20/62 707/758 |
| 2019/0163612 A1* | 5/2019 | Michalski | G06F 11/3688 |
| 2019/0197316 A1* | 6/2019 | Bornfreedom | H04N 21/47205 |
| 2020/0228616 A1* | 7/2020 | Nishikawa | H04L 67/54 |
| 2021/0333983 A1* | 10/2021 | Singh | G06F 8/38 |
| 2022/0113991 A1* | 4/2022 | Singh | G06F 11/3438 |
| 2023/0359271 A1* | 11/2023 | Shin | G06F 3/04842 |

* cited by examiner

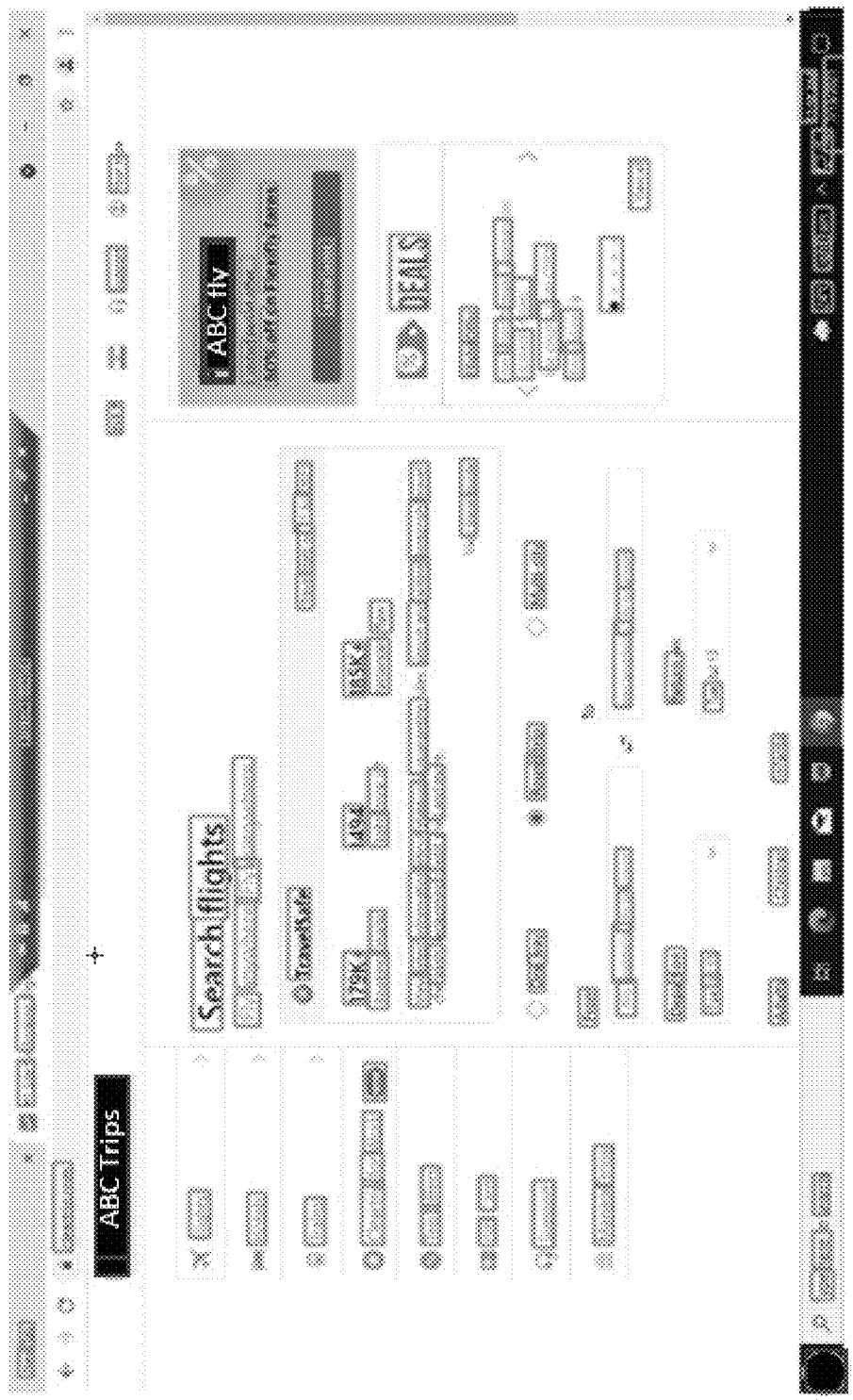
FIG.2B (1)

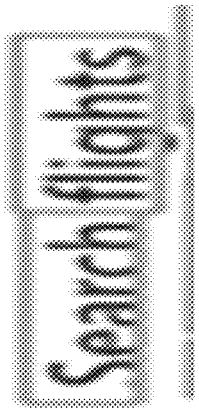
FIG.2B (2)

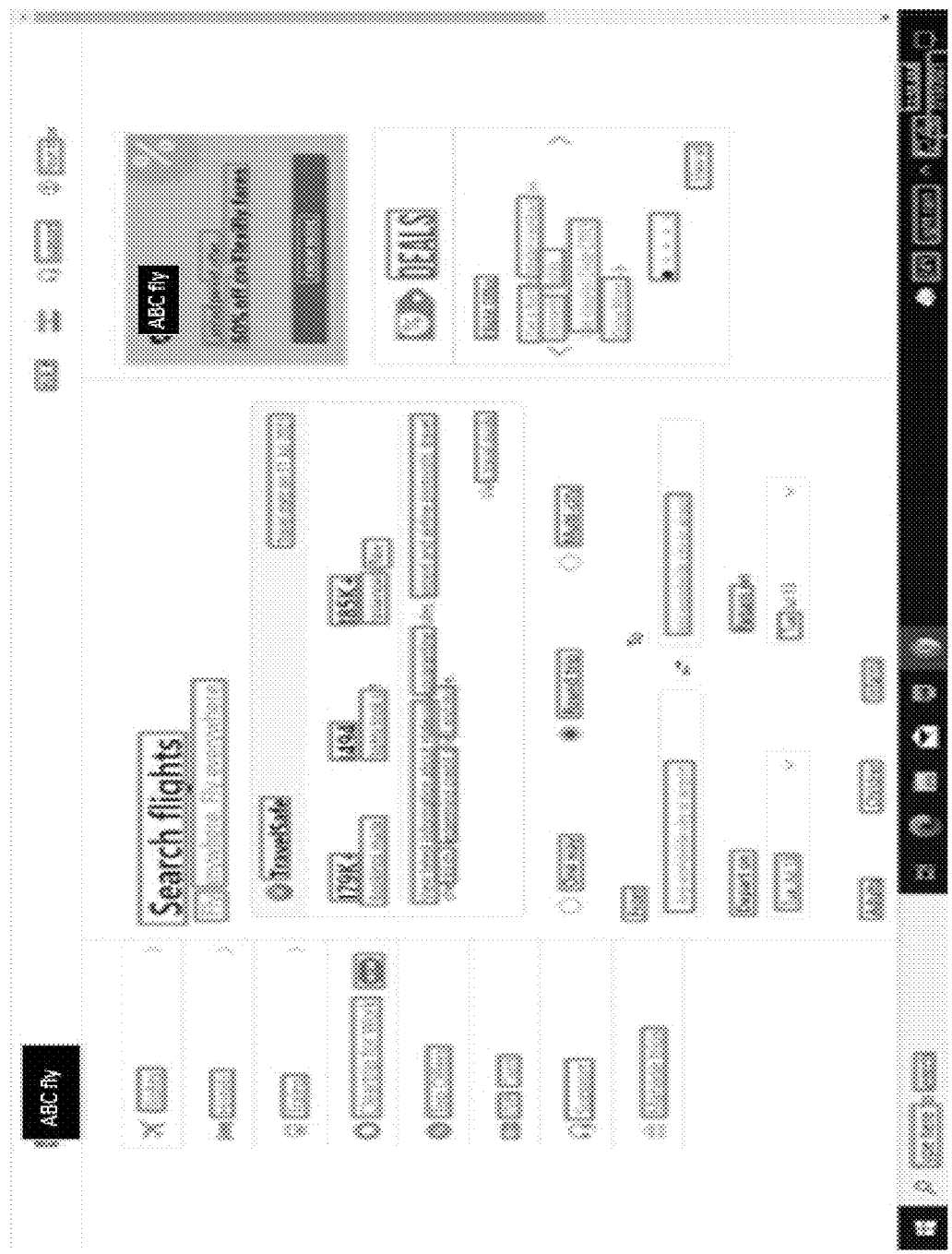
FIG.2C (1)

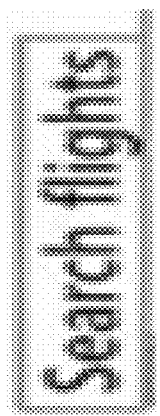
FIG.2C (2)
FIG.2C (3)
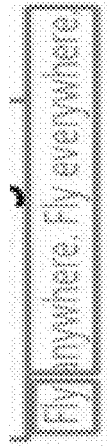
FIG.2C (4)
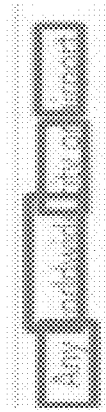
FIG.2C (5)
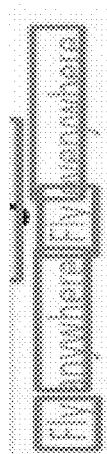
FIG.2C (6)

FIG. 2F

METHOD AND SYSTEM FOR EXTRACTING INFORMATION BASED ON USER INTERACTIONS PERFORMED ON A SCREEN OF A COMPUTING SYSTEM

This application claims the benefit of Indian Patent Application No. 202241027312, filed May 12, 2022, which is incorporated herein by reference in its entirety.

TECHNICAL FIELD

Present disclosure generally relates to field of computer vision. Particularly but not exclusively, the present disclosure relates to a method and system for extracting information based on user interactions performed on a screen of a computing system.

BACKGROUND

Extracting information based on user interactions performed on a screen of a computing system relates to field of computer vision. There are different methods that disclose identifying the type of user interactions performed and getting useful information such as different areas of interest, predicting changes on the screen and the like. One of the existing technologies uses computer vision to identify specific steps in a digital process by observing how work is being done on a computer screen, without the need for any interviews or integrations with backend systems. Further, the existing techniques enable comparing different variants of a process, seamless zooming in-and-out of a process at different levels of detail and analyzing advanced process utilization metrics. Although they compare the video frames and analyze the differences on the screen, these techniques do not consider mapping timestamp and constant shift in position to its corresponding events to get the accurate results. Also, these techniques do not consider co-ordinate point information as input to predict the changes on the screen.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the conventional systems are overcome by system and method as claimed and additional advantages are provided through the provision of system and method as claimed in the present disclosure. Additional features and advantages are realized through the techniques of the present disclosure. Other embodiments and aspects of the disclosure are described in detail herein and are considered a part of the claimed disclosure.

In one non-limiting embodiment of the present disclosure discloses a method for extracting information based on user interactions performed on a screen of a computing system. The method includes receiving, by a computing system, a processed input data comprising a video capturing a screen and user interactions with screen elements of the computing system, one or more events occurring from the user interactions, and co-ordinate information indicating a position of the user interactions with the screen elements. Thereafter, the method includes determining a plurality of regions of interest on the screen based on the captured user interactions, the one or more events and the co-ordinate information, using the text detection and contouring techniques and at least one custom filtering technique. Further, the method includes identifying a type of user interaction performed with at least one screen element in at least one of the plurality of regions of interest. The type of user interaction is one of a keyboard type interaction or a mouse type interaction. Furthermore, the method includes performing one of: determining a type of the screen element to be at least a text box or a table based on pattern recognition and extracting at least one of content and label of the text box or the table, when the type of user interaction is identified to be the keyboard type interaction, or determining a type of the screen element to be one of selectable User Interface (UI) elements and extracting at least one of content and label of the selectable UI element, when the type of interaction is identified to be the mouse type interaction.

Another non-limiting embodiment of the disclosure discloses a computing system for extracting information based on user interactions performed on a screen. The memory stores the processor-executable instructions, which, on execution, causes the processor to receive processed input data comprising a video capturing a screen and user interactions with screen elements of the computing system, one or more events occurring from the user interactions, and co-ordinate information indicating a position of the user interactions with the screen elements. Further, the processor determines a plurality of regions of interest on the screen based on the captured user interactions, the one or more events and the co-ordinate information, using the text detection and contouring techniques and at least one custom filtering technique. Subsequently, the processor identifies a type of user interaction performed with at least one screen element in at least one of the plurality of regions of interest. The type of user interaction is one of a keyboard type interaction or a mouse type interaction. The processor performs one of determining a type of the screen element to be at least a text box or a table based on pattern recognition and extracting at least one of content and label of the text box or the table, when the type of user interaction is identified to be the keyboard type interaction or determining a type of the screen element to be one of selectable User Interface (UI) elements and extracting at least one of content and label of the selectable UI element, when the type of interaction is identified to be the mouse type interaction.

Furthermore, the present disclosure includes a non-transitory computer readable medium including instructions stored thereon that when processed by at least one processor causes a computing system to perform operations comprising identifying one or more trigger points in relation to the one or more anomaly events affecting user experience in the virtual environment. Further, the instructions cause the processor to receive a processed input data comprising a video capturing a screen and user interactions with screen elements of the computing system, one or more events occurring from the user interactions, and co-ordinate information indicating a position of the user interactions with the screen elements. Furthermore, the instructions cause the processor to determine a plurality of regions of interest on the screen based on the captured user interactions, the one or more events and the co-ordinate information, using the text detection and contouring techniques and at least one custom filtering technique. Thereafter, the instructions cause the processor to identify a type of user interaction performed with at least one screen element in at least one of the plurality of regions of interest. The type of user interaction is one of a keyboard type interaction or a mouse type interaction. Finally, the instructions cause the processor to perform one of determine a type of the screen element to be at least a text box or a table based on pattern recognition and extracting at least one of content and label of the text box or the table, when the type of user interaction is identified to be the keyboard type interaction and determine a type of the screen element to be one of selectable User Interface (UI) elements and extracting at least one of content and label of the selectable UI element, when the type of interaction is identified to be the mouse type interaction.

It is to be understood that aspects and embodiments of the disclosure described above may be used in any combination with each other. Several aspects and embodiments may be combined together to form a further embodiment of the disclosure.

The foregoing summary is illustrative only and is not intended to be in any way limiting. In addition to illustrative aspects, embodiments, and features described above, further aspects, embodiments, and features will become apparent by reference to drawings and the following detailed description.

BRIEF DESCRIPTION OF THE FIGURES

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 2B (1) illustrates an exemplary web page with bounding boxes generated around detected textual content when a user interacts with the web page, in accordance with some embodiments of the present disclosure;

FIG. 2B (2) illustrates exemplary textual content detected at an initial level by generating the bounding boxes around each textual content on the screen, in accordance with some embodiments of the present disclosure;

FIG. 2C (1) illustrates exemplary first resultant regions of interest with valid textual screen elements that are obtained by merging based on derived dynamic distance, in accordance with some embodiments of the present disclosure;

FIG. 2C (2) illustrates an exemplary text obtained based on merging of the bounding boxes based on the first threshold distance, in accordance with some embodiments of the present disclosure;

FIG. 2C (3)-(6) illustrate further exemplary texts obtained based on merging, in accordance with some embodiments of the present disclosure;

FIG. 2F shows an exemplary table and a co-ordinate position to identify whether the screen element is a table or the text box, in accordance with some embodiments of the present disclosure;

Figure 1:
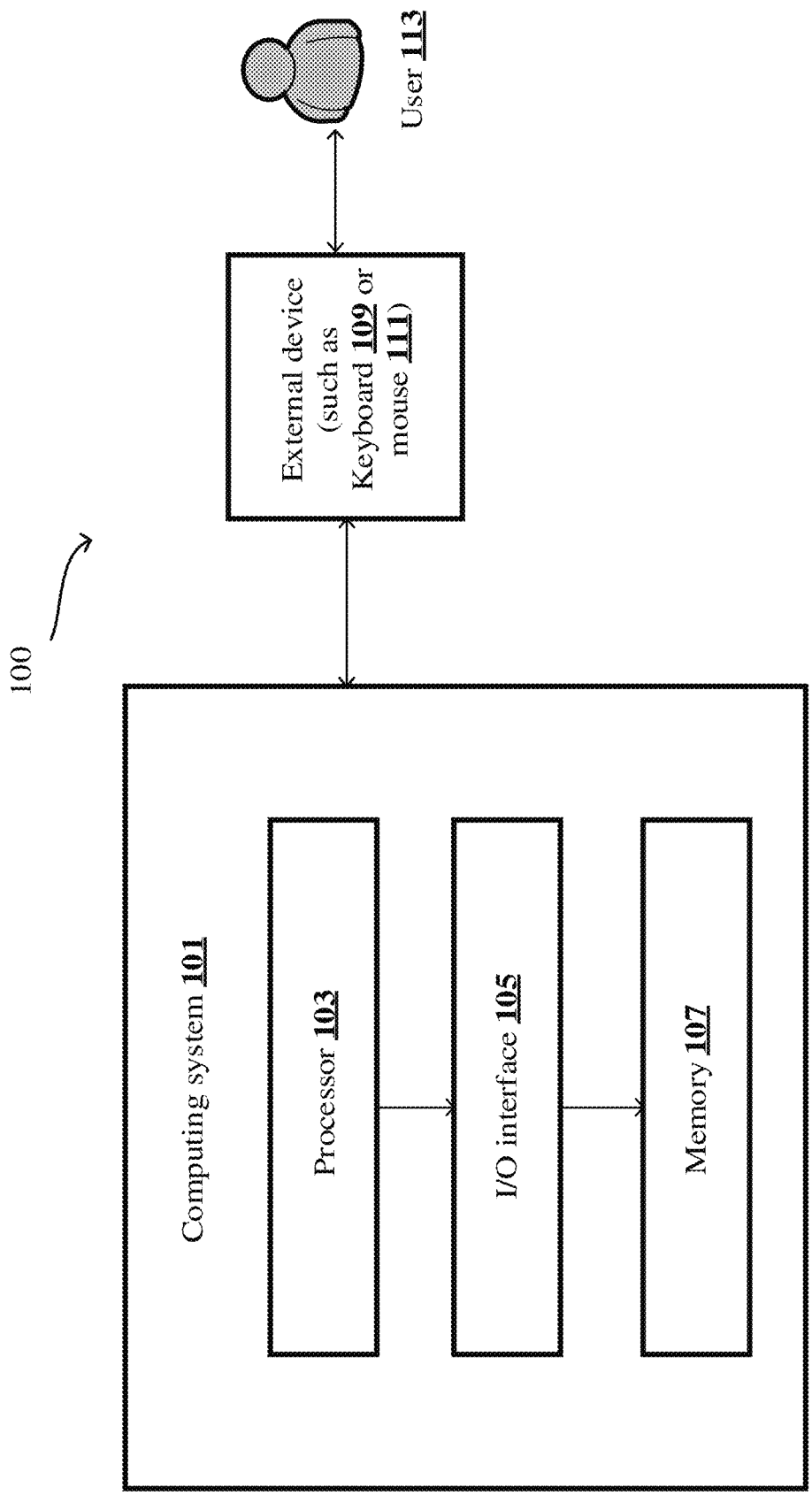
FIG. 1 illustrates an exemplary architecture for extracting information based on user interactions performed on a screen of a computing system, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

The figures depict embodiments of the disclosure for purposes of illustration only. One skilled in the art will readily recognize from the following description that alternative embodiments of the system illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system of extracting information based on user interactions performed on a screen of a computing system. The present disclosure envisages the aspect of detecting user interactions performed on a screen. The type of user interaction may include, but not limited to, keyboard type interaction or a mouse type interaction. In some embodiments, the processed input data is received by the computing system comprising a video capturing a screen and user interactions with screen elements of the computing system, one or more events occurring from the user interactions. One or more events may be keyboard/mouse interaction such as typing, mouse events and the like. The processed input data also comprises co-ordinate information indicating a position of the user interactions with the screen elements. In some embodiments, the co-ordinate information is obtained by mapping one or more events occurring from the user interactions with a timestamp associated with the user interactions resulting in the one or more events.

In the present disclosure, the computing system may determine plurality of regions of interest on the screen based on the captured user interactions, the one or more events and the co-ordinate information, using the text detection and contouring techniques and at least one custom filtering technique. Upon using text detecting technique, the computing system may detect each textual content on the screen and generate a bounding box around each detected textual content. Further, the computing system may merge the bounding boxes based on the first threshold distance by considering valid text on screen. In other words, bounding boxes are merged based on most frequently occurring distance between valid textual elements on the screen. Further, the present disclosure may include detecting each graphical content and corresponding textual content on the screen using the contouring technique and the co-ordinate information and the one or more events. A contour is generated around each detected graphical content and the corresponding textual content. Later the contours are grouped based on the area and coverage limit of the graphical content and the corresponding textual content is determined and the contours which do not occur frequently are filtered out. The filtered contours of the graphical content and the corresponding textual content are then merged based on the second threshold distance comprising the valid graphical screen elements. Finally, the first resultant regions of interest comprising valid textual screen elements and the second resultant regions of interest comprising valid graphical screen elements are determined which indicated the plurality of regions of interest on the screen.

The present disclosure enables detecting type of user interaction performed on plurality of regions of interest on the screen. The type of user interactions may include, but not limited to keyboard or mouse type interaction. The screen element such as a text box or a table is determined based on pattern recognition by extracting at least one of content and label of the text box or the table, when the type of user interaction is identified to be the keyboard type interaction. When there is occurrence of plurality of horizontal and vertical lines above or below the co-ordinate position then the type of screen element is identified as table. When there is only one horizontal and vertical line is identified above or below the co-ordinate position then the screen element is identified as a textbox. Further, in mouse type interaction, a type of the screen element is determined to be one of selectable User Interface (UI) elements and at least one of content and label of the selectable UI element is extracted. In some embodiments, the type of the screen element in mouse type interaction may be determined using an object detection model. In some embodiments, content and label of the selectable UI element may be extracted using Optical Character Recognition (OCR) technique post performing image morphological operation. However, the aforementioned object detection model and OCR technique should not be construed as a limitation of the present disclosure, as any other technique that provides a similar result could be used for performing the determination and extraction steps as disclosed above.

The present disclosure relates to extracting information based on user interactions performed on a screen of a computing system. The present disclosure utilizes a combination of text detection and contouring techniques and filtering techniques and performs merging and filtering of the detected textual content and graphical content based on dynamic determination of thresholds, distances between frequently occurring areas on the screen and coverage limit. This in turn enables accurate determination of the textual content and graphical content present on the screen. Further, the present disclosure enables identification of the exact co-ordinate position on the screen when the user interaction is through keyboard. Furthermore, in the present disclosure, changes occurring on the screen due to user interactions are identified by continuously mapping the exact timestamps to its corresponding events. This helps to identify the changes made by the user on the screen accurately. Further, the present disclosure provides techniques to identify different types of screen elements such as a table, text box, selectable UI elements and the like, based on pattern recognition technique and object detection model disclosed in the present disclosure. This in turn provides help in proper understanding of the user interactions with the screen and the kind of elements with which the user interacted. The present disclosure provides a feature wherein image morphological operations may be performed before text extraction using OCR technique which helps in enhancing the image for accurate text extraction. Also, the present disclosure provides the flexibility of being able to work across all image/video resolutions and image characteristics. As an example, image characteristics may be color, font, and the like.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture for extracting information based on user interactions performed on a screen of a computing system 101, in accordance with an embodiment of the present disclosure.

The architecture 100 includes a computing system 101, external devices such as keyboard 109, mouse 111 and the like and a user 113. In some embodiments, the user 113 may interact with screen elements on screen of the computing system 101. In some embodiments, the user 113 may use external devices such as a keyboard 109 or a mouse 111 to interact with the screen elements. The present disclosure envisages the aspect of detecting user interactions performed on a screen. The present disclosure is explained based on type of user interactions such as keyboard type interaction or a mouse type interaction. However, this should not be construed as only interactions performed using the keyboard 109 or the mouse 111. Rather, the keyboard type interaction or the mouse type interaction should be construed as interactions performed by any other device which allows similar functionality of interacting with elements on screen, or interaction performed using any interface such as a touch interface that allows similar functionality of interacting with elements on the screen.

The external devices may be associated with the computing system 101 via a wired or a wireless communication network. In some embodiments, when the user 113 interacts with the screen elements via the external devices, the computing system 101 may record each of the user interactions using one or more sensors (not shown in the FIG. 1) associated with the computing system 101. For instance, of the one or more sensors may include, but not limited to, image capturing devices such as camera to capture images and videos of the user 113 interacting with the computing system 101.

The computing system 101 may include a processor 103, an I/O interface 105 and a memory 107. The I/O interface 105 may receive a processed input data 205 from a data source associated with the computing system 101. In some embodiments, the input data may include, but not limited to, a video capturing a screen and user interactions with screen elements of the computing system 101, one or more events occurring from the user interactions, and co-ordinate information indicating a position of the user interactions with the screen elements. In some embodiments, the video may be a low-resolution video. In some embodiments, the one or more events occurring from the user interactions may be captured using the one or more sensors. For example, systems often make use of camera sensors to capture images and video of the user interacting with the system. Digital color cameras can be used as sensing devices for inferring human's hands position, poses and gestures, to be translated into suitable commands for the control of virtually every kind of digital system. Further, as an example, the one or more events occurring from the user interactions may be at least one of typing, performing actions using keys of the external device, such as delete, space, enter, directional arrows, or special keys such as ctrl+C, ctrl+V and the like, performing actions using the external device such as a mouse 111 i.e. left/right click of a mouse 111, scrolling events during the user interaction such as billing and transaction process and the like. In some embodiments, the one or more sensors may capture the video for a preconfigured duration. As an example, the preconfigured duration may be 5 frames/second, 10 frames/second and the like, as per requirement. In some embodiments, upon recording the video of the screen and the user interactions with the screen elements of the computing system 101 and one or more events occurring from the user interactions, the method includes obtaining the co-ordinate information indicating the position of the user interactions with the screen elements by mapping one or more events occurring from the user interactions with a timestamp associated with the user interactions resulting in the one or more events. In other words, the processor 103 may break down the video into video frames and associate the video frames with the one or more events based on timestamp of each user interaction followed by identifying area of interest for each event. In some embodiments, the processor 103 may detect consistent changes across multiple video frames related to the event that leads to less chances of faults and easy identification of the changes occurring on the screen due to the user interactions, as each timestamp is matched with its corresponding event consistently.

In some embodiments, when the user interaction is a mouse type interaction, the co-ordinate information may be obtained based on the click operation of the mouse type interaction. However, when the user interaction is a keyboard type interaction, the co-ordinate information needs to be determined. When the user interaction is a keyboard type interaction, to determine the co-ordinate information, the processor 103 may compare continuously a plurality of image frames of screen of the computing system 101 from a point of initiation of the user interaction till end of the user interaction with one or more screen elements on the screen. Upon comparing the plurality of image frames, the processor 103 may determine a plurality of areas on the screen where change occurred due to the user interactions. As an example, the changes occurring due to the user interactions may include, for example, entering a text, shift in the keys, deleting the text, opening a new window or moving to a different screen, and the like. Further, the processor 103 may identify one or more areas of interest among the plurality of areas based on probability of importance of each of the plurality of areas where the change occurred due to the user interaction. Thereafter, the processor 103 may determine the co-ordinate information of the one or more identified areas of interest on the screen, that indicate the position of the user interactions with the screen elements. Based on the processed input data 205 obtained as explained above, the processor 103 may determine a plurality of regions of interest on the screen.

In some embodiments, the processor 103 may determine the plurality of regions of interest on the screen based on the captured user interactions, the one or more events and the co-ordinate information, using the text detection and contouring techniques and at least one technique.

Upon determining the plurality of regions on the screen as discussed above, the processor 103 may identify a type of user interaction performed with at least one screen element in at least one of the plurality of regions of interest. In some embodiments, the type of user interaction may be identified as one of the keyboard type interaction or the mouse 111 type interaction. When the type of user interaction is identified to be the keyboard type interaction, the processor 103 may determine a type of the screen element that the user interacted with, to be one of a text box or a table. In some embodiments, the processor 103 may determine the type of screen element to be one of the text box or the table based on pattern recognition and extracting at least one of content and label of the text box or the table.

In some other embodiments, when the type of user interaction is identified to be the mouse 111 type interaction, the processor 103 may determine the type of the screen element to be one of selectable User Interface (UI) elements using, but not limited to, an object detection model. Thereafter, the processor 103 may extract at least one of content and label of the selectable UI element using, but not limited to, Optical Character Recognition (OCR) technique post image morphological operations, when the type of interaction is identified to be the mouse 111 type interaction. As an example, the selectable UI elements may include, but not limited to, texts, icons, radio button, checkboxes, dropdown menu and the like.

Figure 2A:
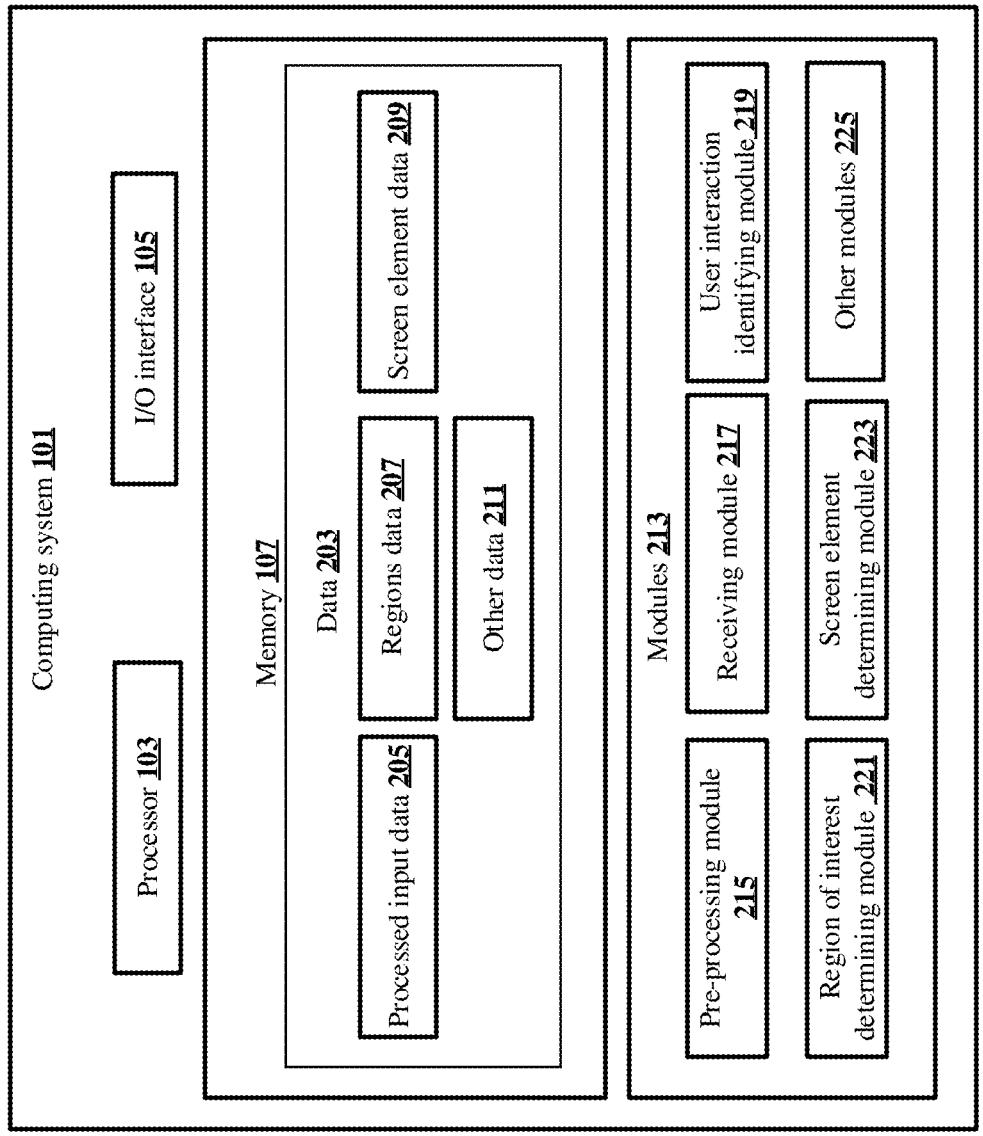
FIG. 2A shows a detailed block diagram of the computing system for extracting information based on user interactions performed on a screen of a computing system, in accordance with some embodiments of the present disclosure.

FIG. 2A shows a detailed block diagram of the computing system 101 for extracting information based on user interactions performed on a screen of a computing system 101, in accordance with some embodiments of the present disclosure. In some implementations, computing system 101 may include data 203 and modules 213. As an example, the data 203 is stored in the memory 107 as shown in the FIG. 2A. In one embodiment, the data 203 may include processed input data 205, regions data 207, screen element data 209 and other data 211. In the illustrated FIG. 2A, modules 213 are described herein in detail.

In some embodiments, the data 203 may be stored in the memory 107 in form of various data structures. Additionally, the data 203 can be organized using data models, such as relational or hierarchical data models. The other data 211 may store data, including temporary data and temporary files, generated by the modules 213 for performing the various functions of the computing system 101.

In some embodiments, the data 203 stored in the memory 107 may be processed by the modules 213 of the computing system 101. The modules 213 may be stored within the memory 107. In an example, the modules 213 communicatively coupled to the processor 103 of the computing system 101, may also be present outside the memory 107 as shown in FIG. 2A and implemented as hardware. As used herein, the term modules refer to an application specific integrated circuit (ASIC), an electronic circuit, a processor 103 (shared, dedicated, or group) and memory 107 that execute one or more software or firmware programs, a combinational logic circuit, and/or other suitable components that provide the described functionality.

In some embodiments, the modules 213 may include, for example, pre-processing module 215, receiving module 217, user interaction identifying module 219, region of interest determining module 221, screen element determining module 223, and other modules 229. The other modules 225 may be used to perform various miscellaneous functionalities of the computing system 101. It will be appreciated that such aforementioned modules 213 may be represented as a single module or a combination of different modules.

In some embodiments, the pre-processing module 215 may receive low-resolution video captured using one or more sensors associated with the computing system 101. The low-resolution video captures one or more events related to user interactions with screen elements on the screen. The type of user interaction may include, but not limited to, one of a keyboard type interaction or a mouse type interaction. As an example, the one or more keyboard and mouse events occurring from the user interactions may be at least one of typing, performing actions using keys of the external device, such as delete, space, enter, directional arrows, or special events such as ctrl +c, ctrl +v, shift operations, or left/right click of mouse 111, scrolling events during the user interaction such as billing and transaction process. The pre-processing module 215 may capture the video for preconfigured duration like 5 frames/second, 10 frames/second and the like, as per requirement. Upon recording the user interaction on the screen and the user interactions with the screen elements, the pre-processing module 215 may obtain the co-ordinate information indicating the position of the user interactions with the screen elements by mapping one or more events occurring from the user interactions with a timestamp associated with the user interactions resulting in the one or more events. In other words, the pre-processing module 215 may break down the video into video frames and associate the video frames with the one or more events based on timestamp of each user interaction followed by identifying area of interest for each event. The pre-processing module 215 may detect consistent across multiple video frames related to the event that leads to less chances of faults and easy identification of the changes occurring on the screen due to the user interactions, as each timestamp is matched with its corresponding event consistently In some embodiments, the receiving module 217 may receive the processed input data 205 comprising a video capturing a screen and user interactions with screen elements of the computing system 101, one or more events occurring from the user interactions, and co-ordinate information indicating a position of the user interactions with the screen elements. The co-ordinate information indicates a position of the user interactions is important to predict the changes on the screen.

In some embodiments, the region of interest determining module 221 may determine the plurality regions of interest on the screen. The plurality of regions of interest on the screen are determined based on the captured user interactions, the one or more events and the co-ordinate information are determined using the text detection and contouring techniques and at least one custom filtering technique. The plurality of regions thus determined may be stored as the regions data 207. In some embodiments, to determine the plurality of regions on the screen using the text detection and contouring techniques and at least one custom filtering technique, the region of interest determining module 221 may initially detect each textual content using the text detection technique, in regions related to the captured user interactions, the co-ordinate information and the one or more events. A bounding box is generated around each detected textual content in the regions related to the user interaction on the screen. Thereafter, the region of interest determining module 221 may merge the bounding boxes based on a first threshold distance limit to get a first resultant regions of interest. In some embodiments, the region of interest determining module 221 may dynamically derive the first threshold distance limit based on frequently occurring distance between valid textual elements on the screen. Thereafter, the region of interest determining module 221 may detect each graphical content and corresponding textual content on the screen using the contouring technique. In some embodiments, the region of interest determining module 221 may generate a contour around each detected graphical content and the corresponding textual content on the screen. In other words, contour is a boundary drawn around the detected graphical content and the corresponding textual content that has well defined edges, which means that the region of interest determining module 221 is able to calculate difference in gradient. Upon generation of contours, the region of interest determining module 221 may group the contours of the graphical content and the corresponding textual content created on the screen based on area. Thereafter, the region of interest determining module 221 may determine a coverage limit based on number of groups of the contours of the graphical content and the corresponding textual content and total number of the contours of the graphical content and the corresponding textual content. In some embodiments, the coverage limit may be defined as the percentage of total contours which may be considered. In some embodiments, the region of interest determining module 221 may perform filtering to retain the contours of the graphical content and the corresponding textual content which correspond to frequently occurring areas that satisfy the coverage limit of the graphical content and the corresponding textual content from the total number of contours. The region of interest determining module 221 may eliminate the remaining contours of the graphical content and the corresponding textual content. In some embodiments, the region of interest determining module 221 may merge the retained contours (filtered contours) of the graphical content and the corresponding textual content based on a second threshold distance limit to obtain second resultant regions of interest comprising valid graphical screen elements. The region of interest determining module 221 may derive the second threshold distance limit dynamically based on frequently occurring distance between valid graphical elements on the screen. Finally, the region of interest determining module 221 may determine the first resultant regions of interest that may include valid textual screen elements and the second resultant regions of interest that may include valid graphical screen elements as the plurality of regions of interest on the screen.

As an example, consider the user is interacting with a web page as shown in the FIG. 2B (1). The region of interest determining module 221 may detect and generate bounding boxes around the textual content of the web page using the method explained in the above paragraph. An exemplary web page with the bounding boxes generated around the detected textual content is as shown in the FIG. 2B (1).

As shown in FIG. 2B (1), bounding boxes are generated around each textual content on the screen. For example, search flights are detected as separate words and bounding box is generated around the textual content as shown in FIG. 2B (2).

Upon on detecting all the textual content on the screen, the generated bounding boxes around each textual contents are merged based on the first threshold distance limit in order to obtain first resultant regions of interest comprising the valid textual screen elements. The screen elements are detected by screen element module. The screen element module comprises screen element data 209 such as valid textual elements, graphical contents. The first resultant regions of interest includes valid textual screen elements that are merged based on the derived dynamic distance. as shown in FIG. 2C (1).

As shown in FIG. 2C (1), the bounding boxes that were generated and depicted in FIG. 2B (1) are merged based on the first threshold distance limit to obtain the first resultant regions of interest comprising valid textual screen elements. For example, textual content "search" and "flights" were detected as separate words that do not have any connection in FIG. 2B (2). After, merging the bounding boxes based on the first threshold distance, the textual content on the screen is shown below in FIG. 2C (2).

Upon detecting the textual content, the region of interest determining module 221 may detect each graphical content and corresponding textual content on the screen using the contouring technique explained above in the present disclosure, in the plurality of regions related to the captured user interactions. Also, the co-ordinate information and the one or more events are detected by the region of interest determining module 221. Contours may be generated around each detected graphical content and the corresponding textual content in an exemplary web page as shown in FIG. 2D.

Figure 2D:
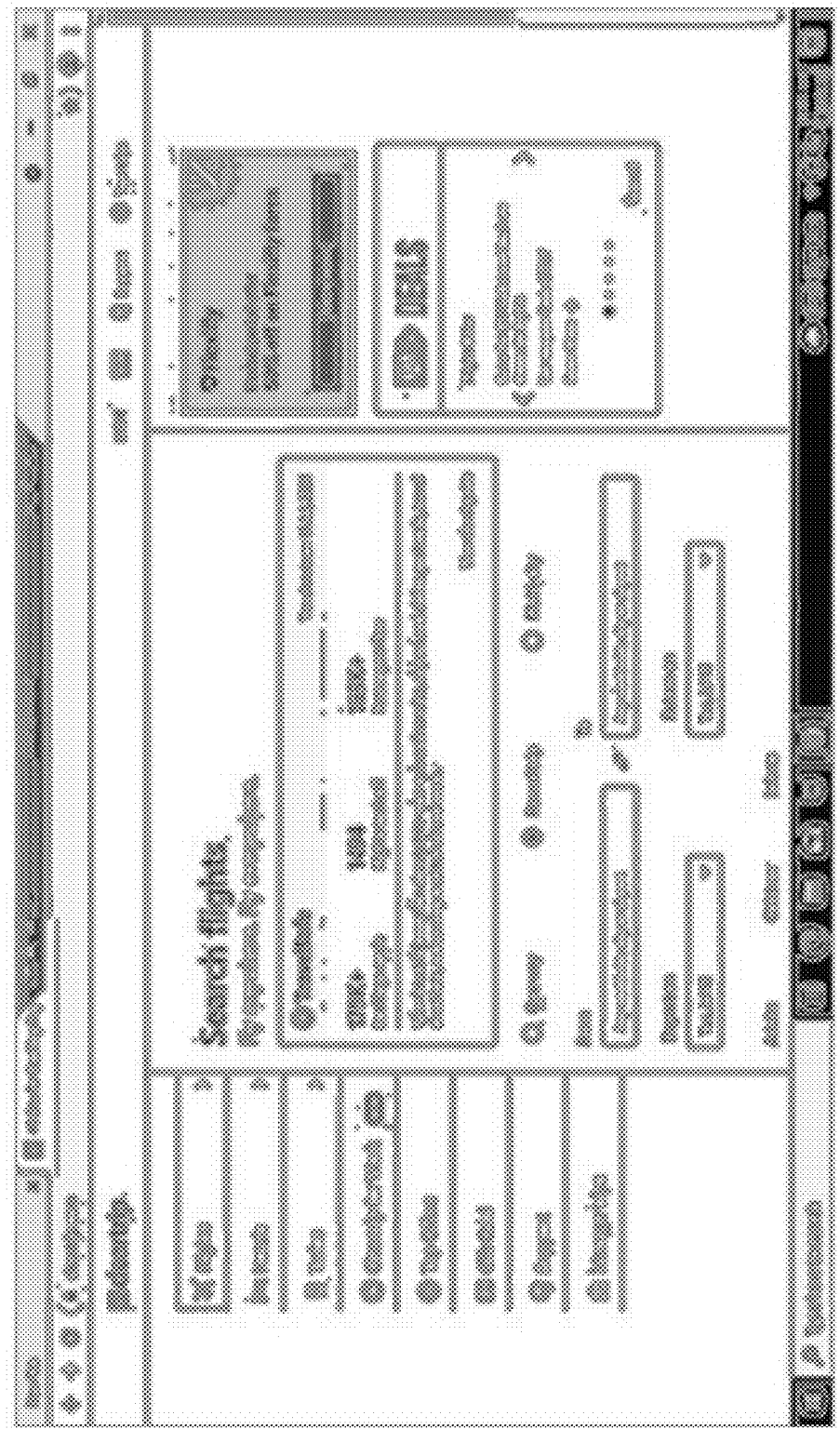
FIG. 2D illustrates exemplary contours that are generated around each detected graphical content and corresponding textual content in an exemplary web page, in accordance with some embodiments of the present disclosure.

As shown in FIG. 2D, the contours are generated around each detected graphical content and the corresponding textual content. Further, the region of interest determining module 221 may group the contours of the graphical content and the corresponding textual content on the screen based on area. Thereafter, the region of interest determining module 221 may calculate the coverage limit of the graphical content and the corresponding textual content based on the number of groups of the contours of the graphical content and the corresponding textual content and total number of the contours of the graphical content and the corresponding textual content. Further, the region of interest determining module 221 may filter the contours of the graphical content and the corresponding textual content to satisfy the coverage limit of the graphical content and the corresponding textual content from the total number of the contours. Finally, the region of interest determining module 221 may merge the filtered contours of the graphical content and the corresponding textual content based on a second threshold distance limit to obtain second resultant regions of interest comprising valid graphical screen elements. The second threshold distance limit is dynamically derived based on frequently occurring distance between valid graphical elements on the screen.

Figure 2E:
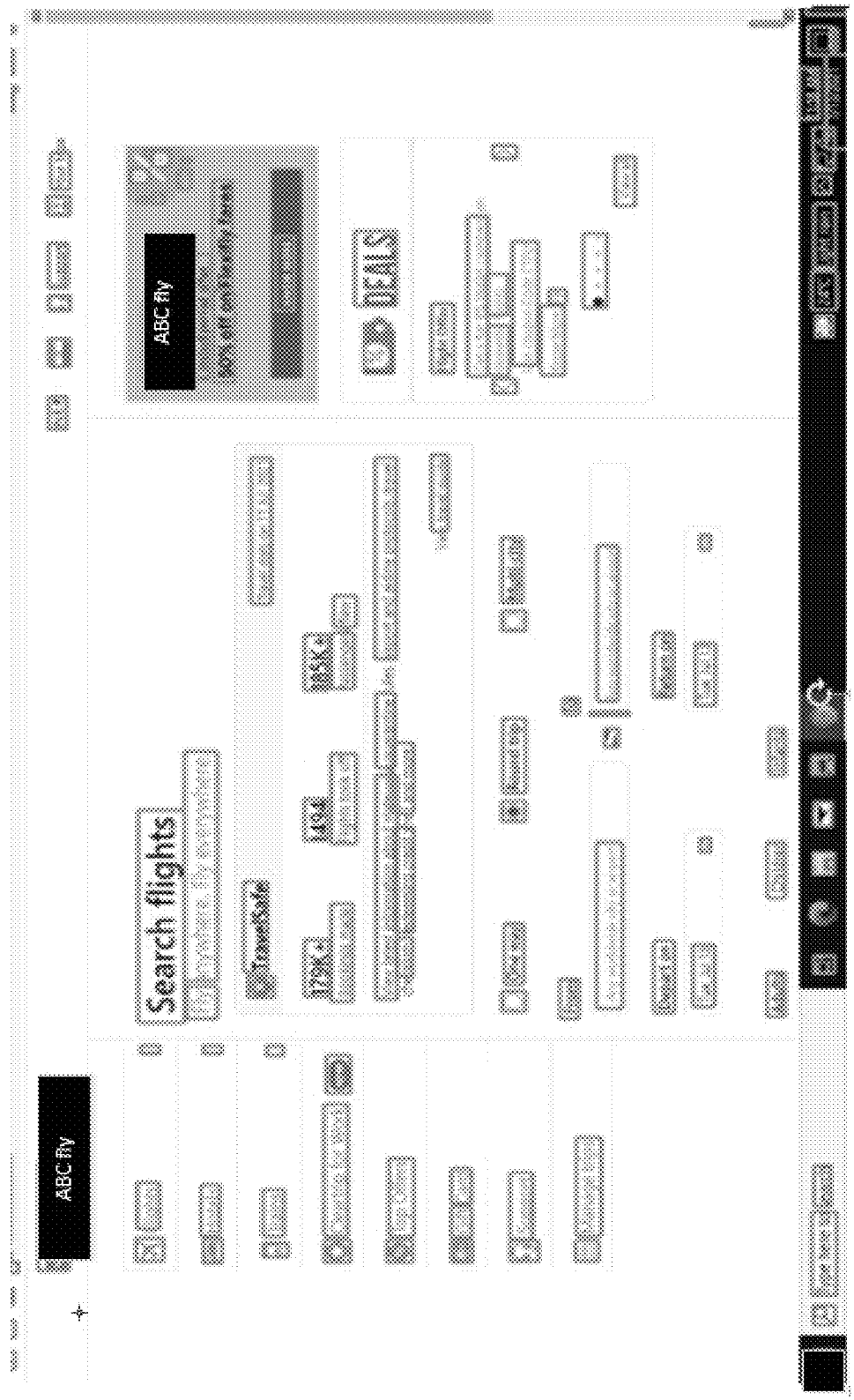
FIG. 2E shows an exemplary web page that indicates finally detected exemplary valid textual screen elements and valid graphical screen elements, in accordance with some embodiments of the present disclosure.

The first resultant regions of interest are determined comprising valid textual screen elements and the second resultant regions of interest comprising valid graphical screen elements may be determined as the plurality of regions of interest on the screen. FIG. 2E shows an exemplary web page that indicates the finally detected exemplary valid textual screen elements and valid graphical screen elements, which are considered to be the plurality of regions of interest on the screen.

In some embodiments, the user interaction identifying module 219 may identify a type of user interaction performed with at least one screen element in at least one of the plurality of regions of interest. In some embodiments, the type of user interaction may be one of a keyboard type interaction or a mouse type interaction. In some embodiments, the type of user interaction may be determined based on the captured video. As an example, when the user interaction is a keyboard type interaction, the screen element determining module 223 may determine a type of the screen element that the user interacted with to be at least a text box or a table based on pattern recognition. Thereafter, the screen element determining module 223 may extract at least one of content and label of the text box or the table. In some embodiments, as part of the pattern recognition technique, the screen element determining module 223 may initially identify co-ordinate position of the keyboard type interaction in the screen. Thereafter, the screen element determining module 223 may identify at least one of occurrence of the plurality of horizontal lines above or below the co-ordinate position and occurrence of the plurality of vertical lines towards left side and right side of the co-ordinate position. When there is plurality of horizontal lines above or below the co-ordinate position and/or occurrence of plurality of vertical lines recurring towards left side or right side of the co-ordinate position, to form a layout, the screen element determining module 223 may detect the type of the screen element to be a table. This is because, a table is generally made up of more than two horizontal lines and vertical lines. Alternatively, when there is only one horizontal identified above or below the co-ordinate position and only one vertical line towards left side and right side of the co-ordinate position, the screen element determining module 223 may detect the type of the screen element to be a text box. In some other embodiments, when the type of user interaction is identified to be the mouse 111 type interaction, the screen element determining module 223 may determine the type of the screen element to be one of selectable User Interface (UI) elements. Thereafter, the screen element determining module 223 may extract at least one of content and label of the selectable UI element, when the type of interaction is identified to be the mouse 111 type interaction. In some embodiments, the selectable UI elements may include, but not limited to, a textual element, icons, radio buttons, dropdown menus, checkboxes, buttons, tables and date picker. The screen elements thus detected may be stored as the screen element data 209.

Figure 2F:
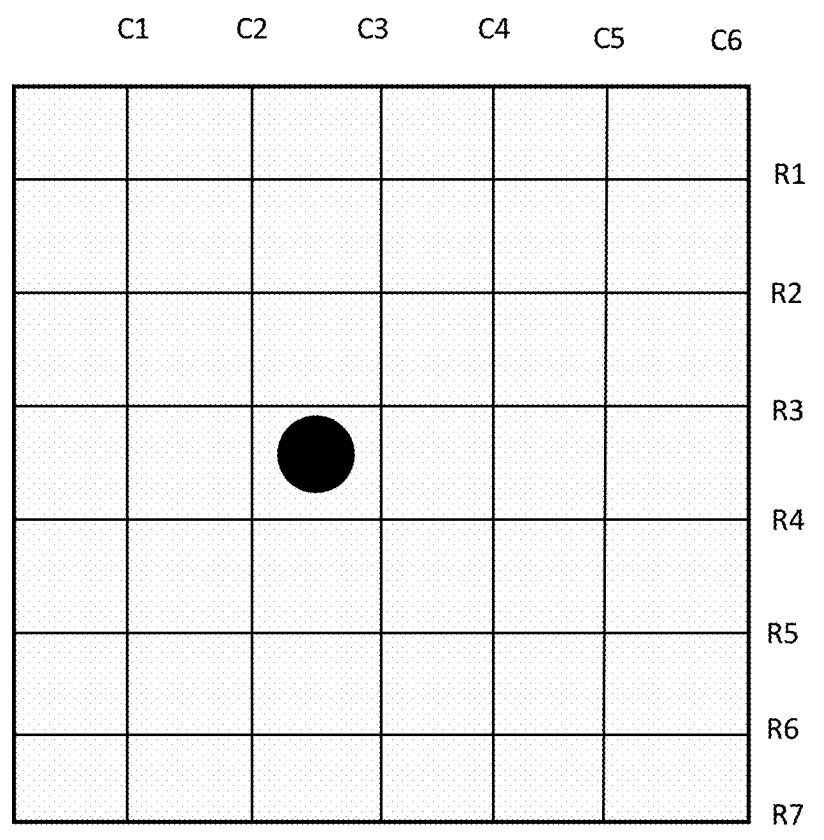

As an example, consider C1, C2 . . . C6 to columns of the table and R1, R2, . . . R6 to be a rows of the table as shown in the FIG. 2F. Assume that the user is pointing to (C3, R4) as shown in the FIG. 2F, where the change is detected on the screen. To identify whether it is the table or the text box, the screen element determining module 223 may check for occurrence of plurality of horizontal and vertical lines above or below and left or right of the co-ordinate position, respectively. In the FIG. 2F, there are 4 horizontal lines above and below the dot in (C3, R4) position, and 3 vertical lines to the left and 4 vertical lines to the right of the dot in (C3, R4) position. Since, there are recurring plurality of horizontal and vertical lines above or below and left or right of the co-ordinate position, the screen element determining module 223 may determine the screen element as a table.

Figure 3A:
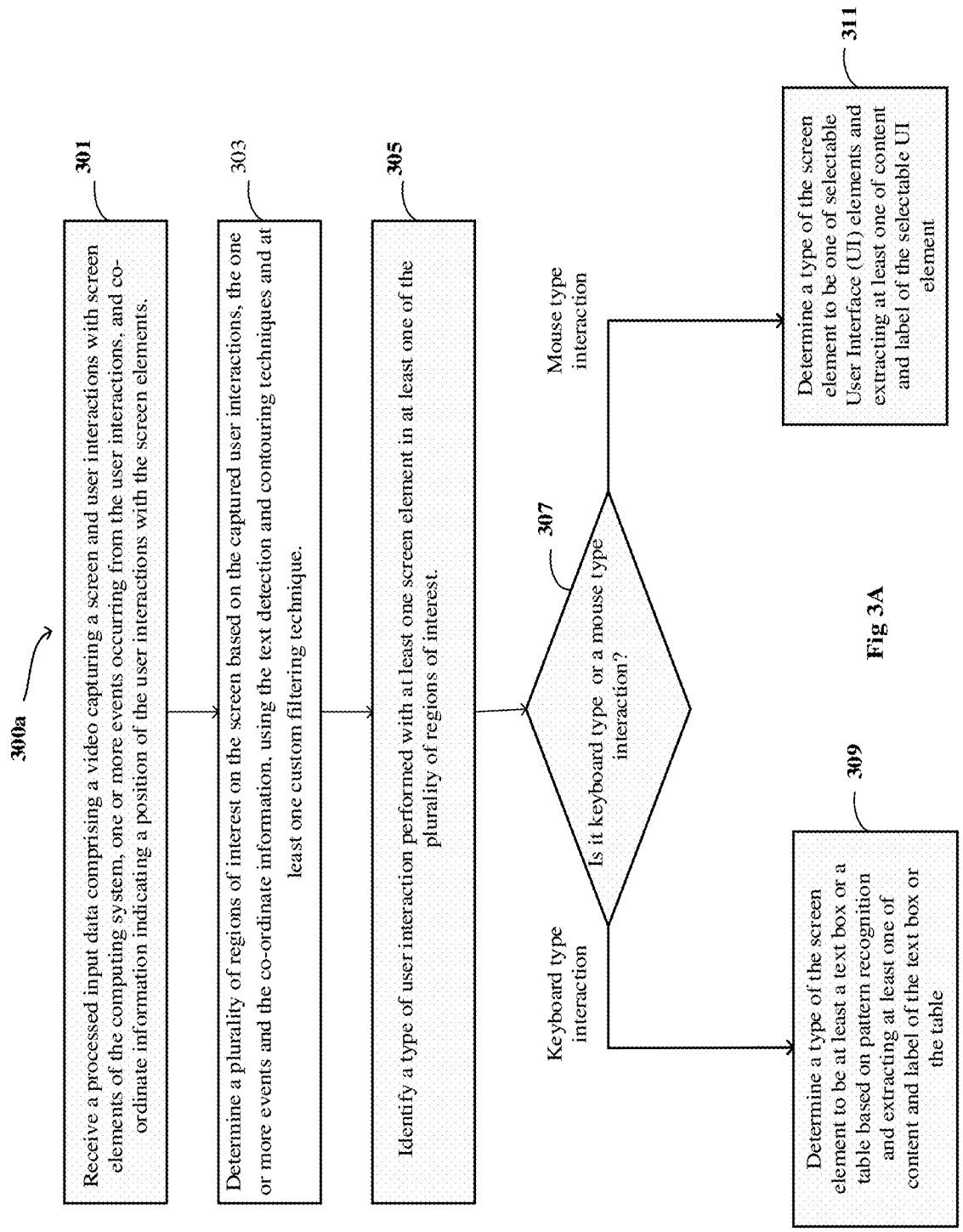
FIG. 3A shows a flowchart illustrating a method for extracting information based on user interactions performed on a screen of a computing system, in accordance with some embodiments of the present disclosure.

FIG. 3A illustrates a flowchart of a method for extracting information based on user interactions performed on a screen of a computing system 101, in accordance with some embodiments of the present disclosure.

As illustrated in FIG. 3, the method 300a includes one or more blocks illustrating a method of extracting information based on user interactions performed on a screen of a computing system 101. The method 300a may be described in the general context of computer executable instructions. Generally, computer executable instructions can include routines, programs, objects, components, data structures, procedures, modules, and functions, which perform functions or implement abstract data types.

The order in which the method 300a is described is not intended to be construed as a limitation, and any number of the described method blocks can be combined in any order to implement the method 300a. Additionally, individual blocks may be deleted from the methods without departing from the spirit and scope of the subject matter described herein. Furthermore, the method 300a can be implemented in any suitable hardware, software, firmware, or combination thereof.

At block 301, the method 300a may include receiving, by a processor 103 of a computing system 101, a processed input data 205 comprising a video capturing a screen and user interactions with screen elements of the computing system 101, one or more events occurring from the user interactions, and co-ordinate information indicating a position of the user interactions with the screen elements.

At block 303, the method 300a may include determining, by the processor 103, a plurality of regions of interest on the screen based on the captured user interactions, the one or more events and the co-ordinate information, using the text detection and contouring techniques and at least one custom filtering technique.

At block 305, the method 300a may include identifying by the processor 103, a type of user interaction performed with at least one screen element in at least one of the plurality of regions of interest. In some embodiments, the type of user interaction may be one of a keyboard type interaction or a mouse 111 type interaction. In some embodiments, keyboard type interaction may be performed using for instance, external devices such as keyboard 109 and its equivalents, or using keypads on touch interfaces. In some embodiments, mouse type interaction may be performed using for instance, external devices such as mouse 111 and its equivalents, or using touch interfaces that provide functionality of a mouse 111.

At block 307, the processor 103 checks for a condition to see whether if user interaction is one of a keyboard type interaction or a mouse 111 type interaction. If the user interaction is performed by keyboard 109, the method proceeds to block 309. If the user interaction is performed by mouse 111, the method proceeds to block 311.

At block 309, the method 300a may include determining, by the processor 103, a type of the screen element to be at least a text box or a table based on pattern recognition and extracting at least one of content and label of the text box or the table, when the type of user interaction is identified to be the keyboard type interaction.

At block 311, the method 300 may include determining, by the processor 103, a type of the screen element to be one of selectable User Interface (UI) elements and extracting at least one of content and label of the selectable UI element, when the type of interaction is identified to be the mouse 111 type interaction.

At block 309, the method 300a may include determining, by the processor 103, a type of the screen element to be at least a text box or a table based on pattern recognition and extracting at least one of content and label of the text box or the table. In some embodiments, the processor 103 may determine the type of the screen elements, using a model such as an object detection model. However, this should not be construed as a limitation. In some embodiments, the at least one of the content and label of the text box or the table may be extracted using a technique such as an Optical Character Recognition (OCR) technique post image morphological operation. However, this should not be construed as a limitation. The process of detecting the type of screen element is indicated in FIG. 3B, which is explained in detail in FIG. 3B.

Figure 3B:
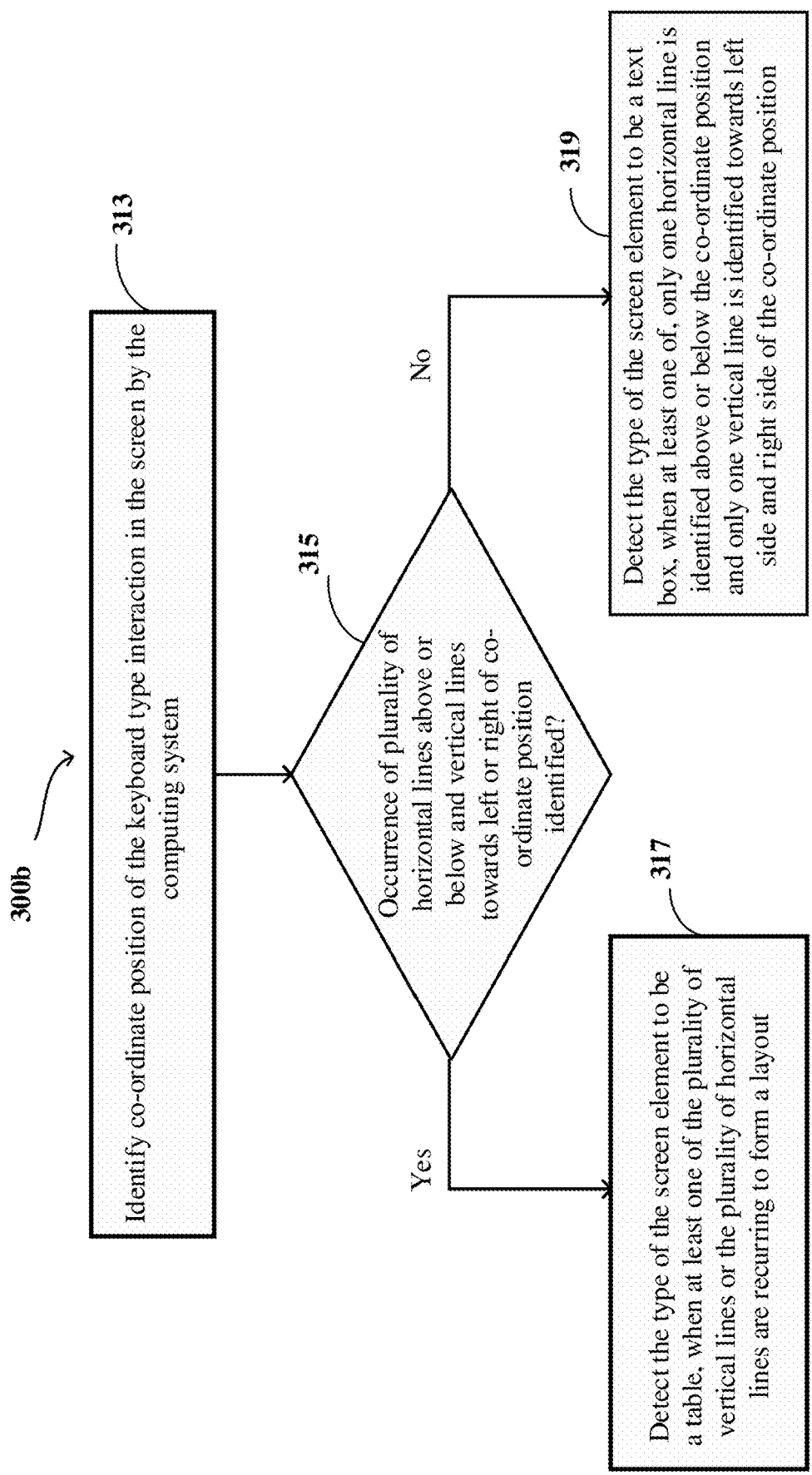
FIG. 3B shows a flowchart illustrating a method for detecting the type of screen element, in accordance with some embodiments of the present disclosure.

FIG. 3B illustrates a flowchart illustration of a method for detecting the type of screen element, in accordance with some embodiments of the present disclosure;

As illustrated in FIG. 3B, the method 300b includes one or more blocks illustrating a method determining if the user interaction is keyboard type. The method 300b may be described in the general context of computer executable instructions. Generally, computer executable instructions can include routines, programs, objects, components, data structures, procedures, modules, and functions, which perform functions or implement abstract data types.

The order in which the method 300b is described is not intended to be construed as a limitation, and any number of the described method blocks can be combined in any order to implement the method 300b. Additionally, individual blocks may be deleted from the methods without departing from the spirit and scope of the subject matter described herein. Furthermore, the method 300b can be implemented in any suitable hardware, software, firmware, or combination thereof.

At block 313, the method 300b may include identifying, by the processor 103, co-ordinate position of the keyboard type interaction in the screen.

At block 315, the method 300b may include checking for occurrence of plurality of horizontal lines above or below the co-ordinate position and occurrence of plurality of vertical lines towards left side and right side of the co-ordinate position. If there is occurrence of at least one of, plurality of horizontal lines above or below the co-ordinate position and plurality of vertical lines towards left side and right side of the co-ordinate position, the method proceeds to block 317 via "yes". If there is no occurrence of at least one of, plurality of horizontal lines above or below the co-ordinate position and plurality of vertical lines towards left side and right side of the co-ordinate position, the method proceeds to block 318 via "No".

At block 317, the method 300*b* may include detecting, by the processor 103, the type of the screen element to be a table, when at least one of the plurality of vertical lines and the plurality of horizontal lines are recurring to form a layout. As an example, the layout may refer to a layout that depicts a table.

At block 318, the method 300*b* may include detecting, by the processor 103, the type of the screen element to be a text box, when at least one of, only one horizontal line is identified above or below the co-ordinate position and only one vertical line is identified towards left side and right side of the co-ordinate position.

Figure 3C:
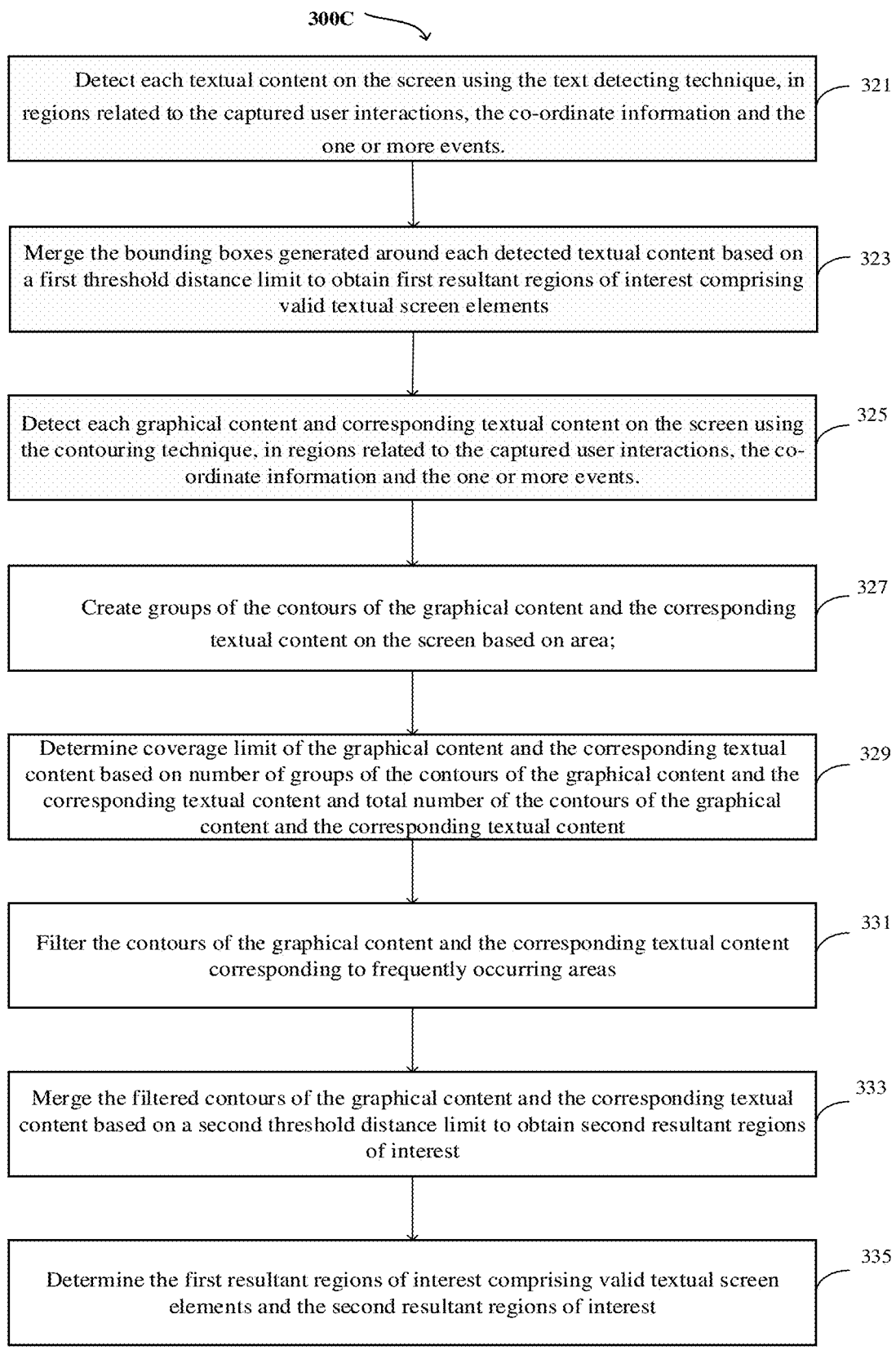
FIG. 3C shows a flowchart illustrating a method for determining the plurality of regions on the screen using the text detection and contouring techniques and at least one custom filtering technique, in accordance with some embodiments of the present disclosure.

FIG. 3C illustrates a flowchart illustration of a method for determining the plurality of regions on the screen using the text detection and contouring techniques and at least one custom filtering technique, in accordance with some embodiments of the present disclosure.

At block 321, the method 300*c* may include detecting, by the processor 103, each textual content on the screen using the text detecting technique, in regions related to the captured user interactions, the co-ordinate information and the one or more events. A bounding box is generated around each detected textual content.

At block 323, the method 300*c* may include merging, by the processor 103, the bounding boxes generated around each detected textual content based on a first threshold distance limit to obtain first resultant regions of interest comprising valid textual screen elements, wherein the first threshold distance limit is dynamically derived based on frequently occurring distance between valid textual elements on the screen.

At block 325, the method 300*c* may include detecting, by the processor 103, each graphical content and corresponding textual content on the screen using the contouring technique, in regions related to the captured user interactions, the co-ordinate information and the one or more events, wherein a contour is generated around each detected graphical content and the corresponding textual content.

At block 327, the method 300*c* may include creating, by the processor 103, groups of the contours of the graphical content and the corresponding textual content on the screen based on area.

At block 329, the method 300*c* may include determining, by the processor 103, coverage limit of the graphical content and the corresponding textual content based on number of groups of the contours of the graphical content and the corresponding textual content and total number of the contours of the graphical content and the corresponding textual content.

At block 331, the method 300*c* may include filtering, by the processor 103, the contours of the graphical content and the corresponding textual content corresponding to frequently occurring areas that satisfy the coverage limit of the graphical content and the corresponding textual content from the total number of the contours.

At block 333, the method 300*c* may include merging, by the processor 103, the filtered contours of the graphical content and the corresponding textual content based on a second threshold distance limit to obtain second resultant regions of interest comprising valid graphical screen elements, wherein the second threshold distance limit is dynamically derived based on frequently occurring distance between valid graphical elements on the screen.

At block 335, the method 300*c* may include determining, by the processor 103, the first resultant regions of interest comprising valid textual screen elements and the second resultant regions of interest comprising valid graphical screen elements to be the plurality of regions of interest on the screen.

Figure 4:
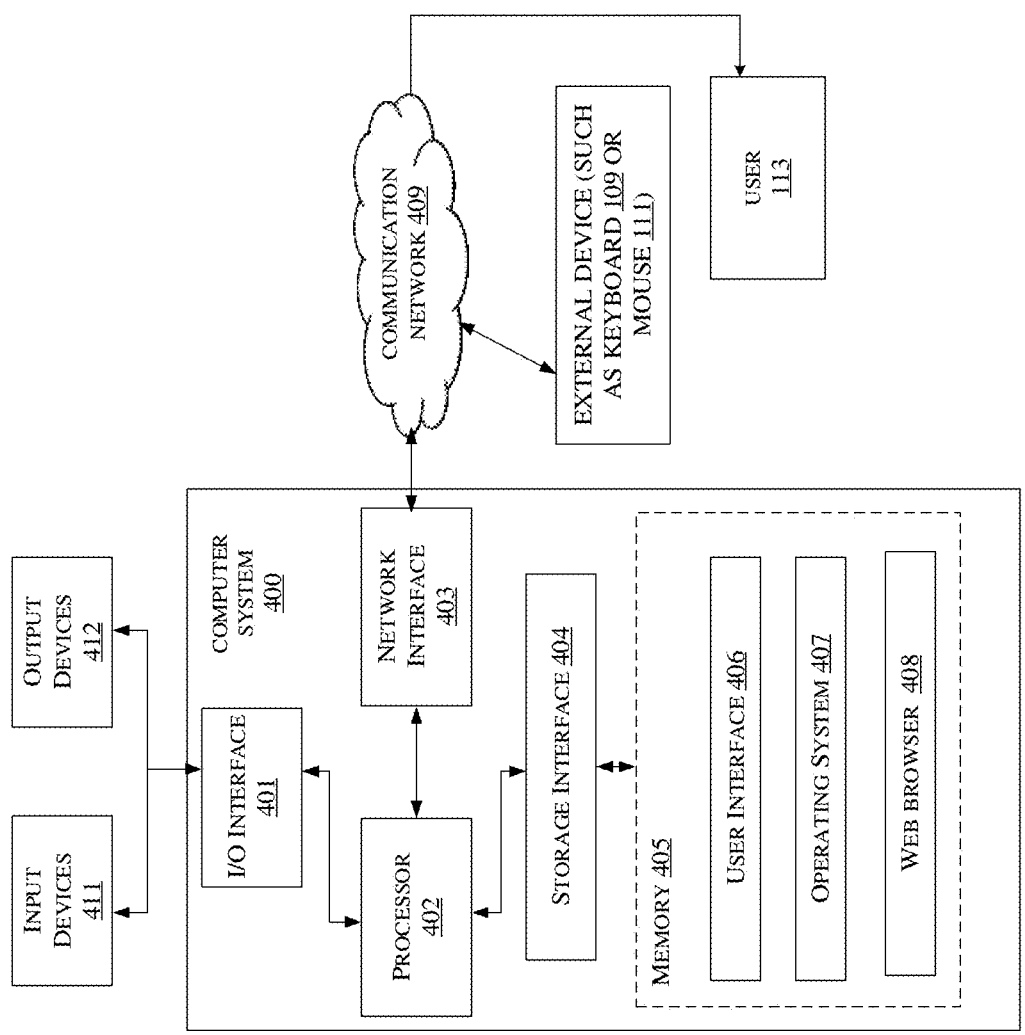
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present technology. In some embodiments, the computer system 400 may be a computing system 101 that is used for extracting information based on user interactions performed on a screen. The computer system 400 may include a central processing unit ("CPU" or "processor 402"). The processor 402 may include at least one data processor 402 for executing program components for executing user or system-generated business processes. A user may include a person, a person using a device such as those described and/or illustrated herein, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with external device such as but not limited to keyboard 109 and mouse 111 and user 415. The communication network 409 can be implemented as one of the different types of networks, such as intranet or Local Area Network (LAN), Closed Area Network (CAN) and such within the vehicle 101. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The user device 113 may include, but not limited to, a mobile phone, a tablet, a laptop and the like. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described herein. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G, BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™ BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present technology. A computer-readable storage medium refers to any type of physical memory on which information or data readable by a processor 402 may be stored. Thus, a computer-readable storage medium may store instructions for execution by one or more processor 402, including instructions for causing the processor 402 to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

We claim:

1. A method of extracting information based on user screen interactions, the method implemented by a computing system and comprising:
   receiving processed input data comprising a video capturing a screen and user interactions with elements of the screen, one or more events occurring from the user interactions, and co-ordinate information indicating a position of the user interactions;
   determining a plurality of regions of interest on the screen based on the user interactions, the one or more events, and the co-ordinate information, using one or more text detection techniques to detect textual content, one or more contouring techniques to detect graphical content and corresponding textual content, and at least one filtering technique;
   determining whether a first type of at least one of the user interactions performed with at least one of the screen elements in at least one of the plurality of regions of interest is a mouse type interaction or a keyboard type interaction and;
   determining a second type of the at least one of the screen elements to be at least one of a text box or a table based on pattern recognition and extracting at least one of first content or a first label of the text box or the table, when the first type of the at least one of the user interactions is determined to be the keyboard type interaction; and
   determining a third type of the at least one of the screen elements to be a selectable User Interface (UI) element and extracting at least one of second content or a second label of the selectable UI element, when the first type of the at least one of the user interactions is determined to be the mouse type interaction.

2. The method as claimed in claim 1, further comprising capturing the video and the one or more events using one or more sensors associated with the computing system.

3. The method as claimed in claim 1, further comprising obtaining the co-ordinate information by mapping the one or more events with a timestamp associated with the user interactions resulting in the one or more events.

4. The method as claimed in claim 1, wherein, when the first type of the at least one of the user interactions is determined to be the keyboard type interaction, the co-ordinate information of the at least one of the user interactions is determined by:

continuously comparing a plurality of image frames of the screen from a point of initiation of the at least one of the user interactions until an end of the at least one of the user interactions with one or more of the screen elements;

determining based on the comparison a plurality of areas on the screen where change occurred due to the at least one of the user interactions;

identifying one or more areas of interest among the plurality of areas based on a probability of importance of each of the plurality of areas where the change occurred due to the at least one of the user interactions; and determining the co-ordinate information of the at least one of the user interactions based on other co-ordinate information for the identified one or more areas of interest, wherein the co-ordinate information indicates a position of the at least one of the user interactions.

5. The method as claimed in claim 1, further comprising generating a contour around each detected graphical content and the corresponding textual content, wherein the at least one filtering technique retains only one or more of the contours corresponding to frequently occurring areas that satisfy a coverage limit.

6. The method as claimed in claim 1, wherein determining the plurality of regions of interest further comprises:

detecting each textual content on the screen using the one or more text detection techniques, in one or more of the plurality of regions of interest related to the user interactions, the co-ordinate information, and the one or more events, wherein a bounding box is generated around each detected textual content;

merging the bounding boxes generated around each detected textual content based on a first threshold distance limit to obtain first resultant regions of interest comprising valid textual screen elements, wherein the first threshold distance limit is dynamically derived based on a frequently occurring distance between the valid textual screen elements;

detecting each graphical content and corresponding textual content on the screen using the one or more contouring techniques, in one or more of the plurality of regions of interest related to the user interactions, the co-ordinate information, and the one or more events;

creating groups of the contours based on area;

determining the coverage limit of the graphical content and the corresponding textual content based on a number of the groups of the contours and a total number of the contours;

filtering the contours corresponding to frequently occurring areas that satisfy the coverage limit of the graphical content and the corresponding textual content from the total number of the contours;

merging the filtered contours based on a second threshold distance limit to obtain second resultant regions of interest comprising valid graphical screen elements, wherein the second threshold distance limit is dynamically derived based on a frequently occurring distance between the valid graphical screen elements; and determining the first resultant regions of interest and the second resultant regions of interest to be the plurality of regions of interest on the screen.

7. The method as claimed in claim 1, wherein determining the second type of the at least one of the screen elements further comprises:

identifying a co-ordinate position of the keyboard type interaction on the screen; and identifying at least one of an occurrence of a plurality of horizontal lines above or below the co-ordinate position or an occurrence of a plurality of vertical lines towards a left side or a right side of the co-ordinate position and at least one of:

detecting the second type of the at least one of the screen elements to be the table, when at least one of the plurality of vertical lines or the plurality of horizontal lines is recurring to form a layout, or detecting the second type of the at least one of the screen elements to be the text box, when only one horizontal line is identified above or below the co-ordinate position and only one vertical line is identified towards the left side or the right side of the co-ordinate position.

8. A computing system, comprising:

one or more processors; and memory communicatively coupled to the one or more processors and storing processor-executable instructions, which, on execution by the one or more processors, cause the one or more processors to:

receive processed input data comprising a video capturing a screen and user interactions with elements of the screen, one or more events occurring from the user interactions, and co-ordinate information indicating a position of the user interactions;

determine a plurality of regions of interest on the screen based on the user interactions, the one or more events, and the co-ordinate information, using one or more text detection techniques to detect textual content, one or more contouring techniques to detect graphical content and corresponding textual content, and at least one filtering technique;

determine whether a first type of at least one of the user interactions with at least one of the screen elements in at least one of the plurality of regions of interest is a mouse type interaction or a keyboard type interaction;

determine a second type of the at least one of the screen elements to be at least one of a text box or a table based on pattern recognition and extracting at least one of first content or a first label of the text box or the table, when the first type of the at least one of the user interactions is determined to be the keyboard type interaction; and determine a third type of the at least one of the screen elements to be a selectable User Interface (UI) element and extracting at least one of second content or a second label of the selectable UI element, when the first type of the at least one of the user interactions is determined to be the mouse type interaction.

9. The computing system as claimed in claim 8, wherein the processor-executable instructions, on execution by the one or more processors, further cause the one or more processors to capture the video and the one or more events using one or more sensors associated with the computing system.

10. The computing system as claimed in claim 8, wherein, to obtain the co-ordinate information, the processor-executable instructions, on execution by the one or more processors, further cause the one or more processors to map the one or more events with a timestamp associated with the user interactions resulting in the one or more events.

11. The computing system as claimed in claim 8, wherein, to determine the co-ordinate information of the at least one of the user interactions when the first type of the at least one of the user interactions is determined to be the keyboard type interaction, the processor-executable instructions, on execution by the one or more processors, further cause the one or more processors to:
  continuously compare a plurality of image frames of the screen from a point of initiation of the at least one of the user interactions until an end of the at least one of the user interactions with one or more of the screen elements;
  determine based on the comparison a plurality of areas on the screen where change occurred due to the at least one of the user interactions;
  identify one or more areas of interest among the plurality of areas based on a probability of importance of each of the plurality of areas where the change occurred due to the at least one of the user interactions; and
  determine the co-ordinate information of the at least one of the user interactions based on other co-ordinate information for the identified one or more areas of interest, wherein the co-ordinate information indicates a position of the at least one of the user interactions.

12. The computing system as claimed in claim 8, wherein the processor-executable instructions, on execution by the one or more processors, further cause the one or more processors to generate a contour around each detected graphical content and the corresponding textual content, wherein the at least one filtering technique retains only one or more of the contours corresponding to frequently occurring areas that satisfy a coverage limit.

13. The computing system as claimed in claim 8, wherein, to determine the plurality of regions of interest, the processor-executable instructions, on execution by the one or more processors, further cause the one or more processors to:
  detect each textual content on the screen using the one or more one or more text detection techniques, in one or more of the plurality of regions of interest related to the user interactions, the co-ordinate information, and the one or more events, wherein a bounding box is generated around each detected textual content;
  merge the bounding boxes generated around each detected textual content based on a first threshold distance limit to obtain first resultant regions of interest comprising valid textual screen elements, wherein the first threshold distance limit is dynamically derived based on a frequently occurring distance between the valid textual screen elements;
  detect each graphical content and corresponding textual content on the screen using the one or more contouring techniques, in one or more of the plurality of regions of interest related to the user interactions, the co-ordinate information, and the one or more events;
  create groups of the contours based on area;
  determine the coverage limit of the graphical content and the corresponding textual content based on a number of the groups of the contours and a total number of the contours;
  filter the contours corresponding to frequently occurring areas that satisfy the coverage limit of the graphical content and the corresponding textual content from the total number of the contours;
  merge the filtered contours based on a second threshold distance limit to obtain second resultant regions of interest comprising valid graphical screen elements, wherein the second threshold distance limit is dynamically derived based on a frequently occurring distance between the valid graphical screen elements; and
  determine the first resultant regions of interest and the second resultant regions of interest to be the plurality of regions of interest on the screen.

14. The computing system as claimed in claim 8, wherein, to determine the second type of the at least one of the screen elements, the processor-executable instructions, on execution by the one or more processors, further cause the one or more processors to:
  identify a co-ordinate position of the keyboard type interaction on the screen; and
  identify at least one of an occurrence of a plurality of horizontal lines above or below the co-ordinate position or an occurrence of a plurality of vertical lines towards a left side or a right side of the co-ordinate position and at least one of:
    detect the second type of the at least one of the screen elements to be the table, when at least one of the plurality of vertical lines or the plurality of horizontal lines is recurring to form a layout, or
    detect the second type of the at least one of the screen elements to be the text box, when only one horizontal line is identified above or below the co-ordinate position and only one vertical line is identified towards the left side or the right side of the co-ordinate position.

15. A non-transitory computer readable medium including instructions stored thereon that, when executed by at least one processor of a computing system, cause the computing system to:
  receive processed input data comprising a video capturing a screen and user interactions with elements of the screen, one or more events occurring from the user interactions, and co-ordinate information indicating a position of the user interactions;
  determine a plurality of regions of interest on the screen based on the user interactions, the one or more events, and the co-ordinate information, using one or more text detection techniques to detect textual content, one or more contouring techniques to detect graphical content and corresponding textual content, and at least one filtering technique;
  determine whether a first type of at least one of the user interactions performed with at least one of the screen elements in at least one of the plurality of regions of interest is a mouse type interaction or a keyboard type interaction;
  determine a second type of the at least one of the screen elements to be at least one of a text box or a table based on pattern recognition and extracting at least one of first content or a first label of the text box or the table, when the first type of the at least one of the user interactions is determined to be the keyboard type interaction; and
  determine a third type of the at least one of the screen elements to be a selectable User Interface (UI) element and extracting at least one of second content or a second label of the selectable UI element, when the first type of the at least one of the user interactions is determined to be the mouse type interaction.

16. The non-transitory computer readable medium of claim 15, wherein the instructions, when executed by the at least one processor, further cause the computing system to capture the video and the one or more events using one or more sensors associated with the computing system.

17. The non-transitory computer readable medium of claim 15, wherein, to obtain the co-ordinate information, the instructions, when executed by the at least one processor, further cause the computing system to map the one or more events with a timestamp associated with the user interactions resulting in the one or more events.

18. The non-transitory computer readable medium of claim 15, wherein, to determine the co-ordinate information of the at least one of the user interactions when the first type of the at least one of the user interactions is determined to be the keyboard type interaction, the instructions, when executed by the at least one processor, further cause the computing system to:
- continuously compare a plurality of image frames of the screen from a point of initiation of the at least one of the user interactions until an end of the at least one of the user interactions with one or more of the screen elements;
- determine based on the comparison a plurality of areas on the screen where change occurred due to the at least one of the user interactions;
- identify one or more areas of interest among the plurality of areas based on a probability of importance of each of the plurality of areas where the change occurred due to the at least one of the user interactions; and
- determine the co-ordinate information of the at least one of the user interactions based on other co-ordinate information for the identified one or more areas of interest, wherein the co-ordinate information indicates a position of the at least one of the user interactions.

19. The non-transitory computer readable medium of claim 15, wherein the instructions, when executed by the at least one processor, further cause the computing system to generate a contour around each detected graphical content and the corresponding textual content, wherein the at least one filtering technique retains only one or more of the contours corresponding to frequently occurring areas that satisfy a coverage limit.

20. The non-transitory computer readable medium of claim 15, wherein, to determine the plurality of regions of interest, the instructions, when executed by the at least one processor, further cause the computing system to:
- detect each textual content on the screen using the one or more one or more text detection techniques, in one or more of the plurality of regions of interest related to the user interactions, the co-ordinate information, and the one or more events, wherein a bounding box is generated around each detected textual content;
- merge the bounding boxes generated around each detected textual content based on a first threshold distance limit to obtain first resultant regions of interest comprising valid textual screen elements, wherein the first threshold distance limit is dynamically derived based on a frequently occurring distance between the valid textual screen elements;
- detect each graphical content and corresponding textual content on the screen using the one or more contouring techniques, in one or more of the plurality of regions of interest related to the user interactions, the co-ordinate information, and the one or more events;
- create groups of the contours based on area;
- determine the coverage limit of the graphical content and the corresponding textual content based on a number of the groups of the contours and a total number of the contours;
- filter the contours corresponding to frequently occurring areas that satisfy the coverage limit of the graphical content and the corresponding textual content from the total number of the contours;
- merge the filtered contours based on a second threshold distance limit to obtain second resultant regions of interest comprising valid graphical screen elements, wherein the second threshold distance limit is dynamically derived based on a frequently occurring distance between the valid graphical screen elements; and
- determine the first resultant regions of interest and the second resultant regions of interest to be the plurality of regions of interest on the screen.

21. The non-transitory computer readable medium of claim 15, wherein, to determine the second type of the at least one of the screen elements the instructions, when executed by the at least one processor, further cause the computing system to:
- identify a co-ordinate position of the keyboard type interaction on the screen; and
- identify at least one of an occurrence of a plurality of horizontal lines above or below the co-ordinate position or an occurrence of a plurality of vertical lines towards a left side or a right side of the co-ordinate position and at least one of:
  - detect the second type of the at least one of the screen elements to be the table, when at least one of the plurality of vertical lines or the plurality of horizontal lines is recurring to form a layout, or
  - detect the second type of the at least one of the screen elements to be the text box, when only one horizontal line is identified above or below the co-ordinate position and only one vertical line is identified towards the left side or the right side of the co-ordinate position.

* * * * *